United States Patent [19]
Girard et al.

[11] 3,952,266
[45] Apr. 20, 1976

[54] GASEOUS FLUX LASER GENERATOR WITH PRE-IONIZATION GAS INJECTION NOZZLE

[75] Inventors: Geneviéve Girard, Jouy-en-Josas; Maurice Michon, Draveil, both of France

[73] Assignee: Compagnie Generale d'Electricite, Paris Cedex, France

[22] Filed: Apr. 12, 1974

[21] Appl. No.: 460,632

[30] Foreign Application Priority Data
May 3, 1973 France .............................. 73.15898

[52] U.S. Cl. ........................ 331/94.5 G; 313/231.6; 331/94.5 PE
[51] Int. Cl.[2] .................. H01S 3/097; H01J 17/26; H01J 17/30
[58] Field of Search ................ 331/94.5 G, 94.5 PE, 331/94.5 D; 315/111.9, 111.2; 313/231.3, 231.4, 231.5, 231.6; 250/426

[56] References Cited
UNITED STATES PATENTS

| | | | |
|---|---|---|---|
| 3,609,448 | 9/1971 | Williams | 315/111.2 |
| 3,628,181 | 12/1971 | Maitland | 331/94.5 G |
| 3,743,963 | 7/1973 | Bullis et al. | 331/94.5 G |
| 3,863,103 | 1/1975 | Eckbreth | 331/94.5 G |

OTHER PUBLICATIONS
Ecbreth et al., "RF Augmentation in $Co_2$ Closed-Cycle DC Electric–Discharge Convection Lasers," Appl. Phys. Lett., Vol. 21, 7–72, pp. 25–27.
McLeary et al., "Filaments in $CO_2$ Laser Discharges at Atmospheric Pressure" Defence Standards Labs. Maribyrnong, Australia, Rep. No. 486, 12–1971.
Nunge et al., "Analysis of Heat or Mass Transfer in Some Countercurrent Flows" Int. Jr. Heat & Mass Transfer, Vol. 8, 1965, pp. 873–886.
Hall et al., "Interaction Between a Turbulent Free Convection Layer and a Downward Forced Flow," Heat and Mass Transfer by Combined Forced and Natural Convention, Inst. of Mechanical Engineers Symposium 9-15-71. 327S9, pp. 6–12.
McLeary et al., "CW $CO_2$ Laser at Atmospheric Pressure," IEEE Jr. of Quantum Electronics, Vol. 9, 8-1973, pp. 828–833.
Eckbreth et al., "Flow Conditioning in Electric Discharge Convection Lasers," Rev. of Scientific Instruments, Vol. 43, 1972, pp. 995–998.

Primary Examiner—Alfred E. Smith
Assistant Examiner—Wm. H. Punter
Attorney, Agent, or Firm—Sughrue, Rothwell, Mion & Zinn

[57] ABSTRACT

Gaseous flux laser generator comprising a nozzle for injecting a gas into an enclosure, two main electrodes for setting up a discharge in that enclosure and two auxiliary electrodes arranged at the output of the nozzle for ionizing the injected gas.

6 Claims, 1 Drawing Figure

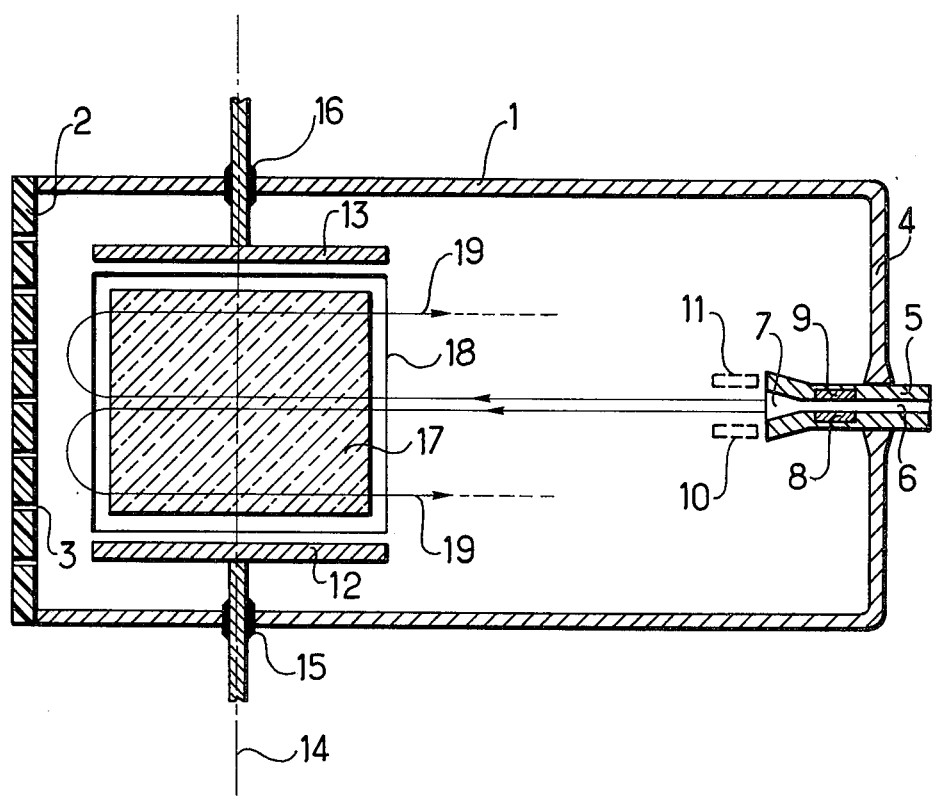

GASEOUS FLUX LASER GENERATOR WITH PRE-IONIZATION GAS INJECTION NOZZLE

The present invention concerns gaseous flux laser generators and more particularly pulsed gaseous flux laser generators.

One knows a continuous gaseous flux laser generator, comprising an elongated enclosure open at one of its ends and in which is injected, by its other end, a first gas (nitrogen) at a supersonic speed to set up a turbulent flow in that enclosure, two electrodes to set up an electric discharge exciting the injected gas, a low pressure expansion chamber into which the enclosure leads by its open end, means for feeding that chamber with a second gas (carbon dioxide) and an optical resonant cavity arranged in that chamber and suitable for setting up the laser effect resulting from the excitation of the second gas by transfer of the excitation energy of the first gas at the time of the mixing of these two gases, are also known.

A gas laser generator capable of operating at pulse rate, comprising an optical resonant cavity containing a gaseous mixture generally at atmospheric pressure and two electrodes to set up short electric discharge in that gaseous mixture is also known.

But the laser pulses obtained by means of that generator have relatively slight power, more particularly because the distance between the electrodes must be short to prevent the discharge from being accompanied by electric arcs sparking between the electrodes and being a great hindrance to the operation of the laser. To avoid that forming of arcs, it has been proposed, to effect pre-ionization, to provide that laser with an electron injection device comprising an electron gun, that injection being effected through openings formed in one of the electrodes. But the laser provided with that device is very expensive and delicate to manufacture because it is difficult to provide sufficient sealing between the electron injection device operating in a vacuum, on the one hand and the enclosure containing the gas mixture, on the other hand.

Furthermore, an article by D. B. Nichols et al, "Radiofrequency Preionization in a Supersonic Transverse Electrical Discharge Laser" (IEEE Journal of Quantum Electronics, vol. QE-8, N° 8, August, 1972, page 718) describes a pulsed gas laser generator in which nitrogen excited by a main electric discharge is mixed with carbon dioxide so as to transfer to it its excitation energy and to enable thus a laser emission within an optical cavity. The mixture is formed in a supersonic jet. The axes of the jet, and of the main discharge are perpendicular. Pre-ionization is effected by an auxiliary discharge which takes place in the vicinity of a main electrode, that is, an electrode taking part in the main discharge a very short time before the latter. The auxiliary discharge is of the radiofrequency type.

The disadvantage of this arrangement is that the electrons produced by that auxiliary discharge do not have a sufficient energy for penetrating a volume having a great dimension containing a gas at high pressure. Now, a great volume and a high pressure are necessary if high power is to be obtained from the laser emission.

As for the ultra-violet radiation produced by that auxiliary discharge, it may contribute to pre-ionization. But that discharge should have an excessive energy if it is required to provide in the volume of gas an electronic density great enough for the main discharge to be able to take place subsequently in good conditions.

The aim of the present invention is to produce a pulsed gaseous flux laser generator with great energy and a great distance between its main electrodes by means of a pre-ionizing device setting up in a simple way a high electric density between these electrodes.

The present invention has for its object a gaseous flux laser generator comprising:

an elongated enclosure partly open at a first of its ends;

a nozzle for injecting a gas into the said enclosure at a high speed, setting up a swirling current, that nozzle leading to the second end of that enclosure parallel to the direction of the length of that enclosure;

two main electrodes placed in the said enclosure and connected to a source of electric power to set up a short "main" discharge in the injected gas;

pre-ionization means for setting up an "auxiliary" discharge in the injected gas so as to ionize it before it is subjected to the said main discharge;

an optical resonant cavity containing, in the said enclosure, a gaseous mixture made active by the said main discharge; that gaseous mixture comprising the said active injected gas;

the optical axis of that cavity, the length of the said enclosure and the axis of the said main discharge forming three distinct directions;

characterized in that the said pre-ionizing means comprise two auxiliary electrodes connected to a source of electrical power and arranged at the output of the said nozzle.

The present invention will be better understood from the following description with reference to the accompanying drawing, by way of an illustration having no limiting character, in which the single FIGURE shows a longitudinal cut-away view of a laser generator according to the invention.

In that FIGURE, an elongated enclosure 1, having, for example, a cylindrical shape, has, at its end 2, several openings, that end 2 possibly being formed by a plate provided with several holes such as 3 regularly spaced out on that plate. An injection nozzle 5 comprising an axial duct 6 having an injection orifice 7 which is divergent towards the inside of the enclosure 1 leads into the other end 4 of the enclosure 1. The axial duct 6 is connected to a source of gas under pressure, not shown. Two auxiliary electrodes, which may be, for example, like the electrodes 8 and 9 fixed on the internallateral surface of the nozzle 5, are arranged at the outlet of the gas of the nozzles, that is, in the vicinity of the orifice 7 of that nozzle. These two electrodes may also be arranged at 10 and 11, as shown by discontinuous lines, on either side of the gaseous flux leaving the nozzle 5. The two electrodes 8 and 9 or 10 and 11 are respectively connected to the output terminals of an electric power source, not shown, arranged on the outside of the enclosure 1, that connection being effected by connecting means crossing through the wall of the enclosure 1 by means of fluid-tight passages, these connecting elements also not being shown.

Two main electrodes 12 and 13 whose discharge axis is in a plane 14 substantially normal to the direction of the length of the enclosure 1 are arranged inside the enclosure 1, but on the side of the end 2 of that enclosure. These electrodes 12 and 13 are connected to an electric power source, not shown, by means of connections crossing through the wall of the enclosure 1 by means of fluid-tight passages 15 and 16. The enclosure 1 contains an optical resonant cavity formed by two reflectors such as the reflector 17, the axis of that cavity being situated substantially in the plane 14 and inclined in that plane on the axis of discharge of the electrodes 12 and 13, these two axes being preferably perpendicular to each other. The enclosure 1 is provided with windows, such as the window 18 arranged on the axis of the cavity.

The operation of the laser generator shown in the FIGURE is as follows:

The gas from the source under pressure is injected into the enclosure 1 through the orifice 6 of the nozzle 5, that gas possibly being formed by a mixture of helium, nitrogen and carbon dioxide. The injecting takes place at supersonic speed and forms a swirling current in the enclosure 1, that current being shown by the arrows 19. The turbulent nature of that current depends on various parameters such as the dimensions of the enclosure and of the orifice of nozzles; the dimensions and the number of the openings 3 are, moreover, chosen to maintain the pressure in the enclosure at a value slightly greater than one atmosphere.

The gas leaving the nozzle 5 is ionized by means of the auxiliary electrodes 8 and 9 or 10 and 11. Taking into account the high injection speed and the duration of the service life of the ionised states, which may be in the order of a few milliseconds, the gas is still ionized when it arrives between the main electrodes 12 and 13.

By means of a high-tension pulse sent out by the electric power source between the electrodes 12 and 13, a short discharge occurs then between these electrodes. That high-tension pulse is controlled preferably a short instant after the putting under voltage of the auxiliary electrodes to take into account the time taken by the pre-ionized gas to arrive between the main electrodes 12 and 13. The electric discharge between the electrodes 12 and 13 energizes the gaseous mixture contained in the optical cavity to generate a laser pulse.

It must be understood that the present invention is in no way limited to the embodiment described above, which has been given only by way of an example. More particularly, without going beyond the scope of the invention, certain devices may be changed and certain means may be replaced by equivalent means.

For example, the gaseous medium excited by the electrodes 12 and 13 may be embodied in different ways. Thus, the gas injected by the nozzle 5 may be helium, the enclosure 1 having been previously filled with carbon dioxide and nitrogen. The gas injected may also be nitrogen, helium and carbon dioxide being arranged previously in the enclosure. These arrangements make it possible to avoid, at the instant of the pre-ionization by the auxiliary electrodes, the forming of oxygen by decomposing carbon dioxide, the existence of oxygen in the gaseous mixture being detrimental to the proper operation of the laser.

Gaseous flux laser generators according to the invention are particularly simple to manufacture and have the advantage of being able to operate without the forming of electric arcs with a very much greater distance between main electrodes than that of presently known lasers. They may be used for the forming of light pulses having a very short duration and great power.

What is claimed is:

1. In a gaseous flux laser generator including:
   an elongated enclosure having restricted opening means at a first end thereof;
   a nozzle for injecting a gas into said enclosure at high speed, said nozzle leading into the second end of said enclosure parallel to the longitudinal axis thereof;
   two main electrodes placed in said enclosure adjacent said first end on opposite sides respectively of the gas flow therethrough remote from said nozzle and connected to a source of electrical power to set up a short "main" discharge in the injected gas;
   pre-ionization means for setting up an auxiliary discharge in the injected gas so as to ionize it before it is subjected to said main discharge;
   an optical resonant cavity containing, in said enclosure, a gaseous mixture made active by said main discharge, said gaseous mixture comprising said injected gas; and wherein; the optical axis of the cavity, the longitudinal axis of said enclosure and the axis of said main discharge extend in three different directions,
   the improvement wherein: said pre-ionizing means comprise two auxiliary electrodes connected to a source of electrical power and arranged at the output of said nozzle on respective sides thereof adjacent said second end and spaced substantially from said main electrodes, said restricted opening means at said first end of said enclosure and said high speed injection nozzle being such as to induce swirling turbulence to said gas flow from said nozzle and across said main electrodes with said pre-ionization of said gas by said auxiliary electrode being remote from said main electrodes such that homogeneous mixing of ions occurs during swirling, turbulent movement of said gas from said nozzle to said main electrodes prior to main discharge with said pre-ionization discharge across said auxiliary electrode at said nozzle effecting easy, powerful and efficient pre-ionization of said gas within the confined volume of the nozzle output.

2. The laser generator according to claim 1, wherein: said auxiliary electrodes are fixed to the internal lateral surface of the said nozzle, just upstream of its discharge end.

3. The laser generator according to claim 1 wherein; said restricted opening means at said first end of said enclosure is formed by a plate provided with several evenly spaced holes.

4. The laser generator according to claim 1, wherein; said injected gas is formed by a mixture of nitrogen, helium and carbon dioxide, and said gaseous mixture consists of said injected gas.

5. The laser generator according to claim 1, wherein; said injected gas is nitrogen, and said gaseous mixture is constituted by said nitrogen, and by carbon dioxide and helium.

6. The laser generator according to claim 1, wherein; said injected gas is helium, and said gaseous mixture is constituted by said helium and by carbon dioxide and nitrogen.

* * * * *